(12) United States Patent
Herman

(10) Patent No.: US 11,242,218 B1
(45) Date of Patent: Feb. 8, 2022

(54) AIR HOSE RETENTION SYSTEM

(71) Applicant: William Herman, Hastings, MN (US)

(72) Inventor: William Herman, Hastings, MN (US)

( * ) Notice: Subject to any disclaimer, the term of this patent is extended or adjusted under 35 U.S.C. 154(b) by 171 days.

(21) Appl. No.: 16/787,584

(22) Filed: Feb. 11, 2020

(51) Int. Cl.
  *B65H 75/48* (2006.01)
  *B65H 75/44* (2006.01)
  *B65H 75/42* (2006.01)

(52) U.S. Cl.
  CPC ......... *B65H 75/486* (2013.01); *B65H 75/425* (2013.01); *B65H 75/4478* (2013.01)

(58) Field of Classification Search
  CPC .... B65H 75/48; B65H 75/425; B65H 75/486; B65H 75/4478
  See application file for complete search history.

(56) References Cited

U.S. PATENT DOCUMENTS

| | | | |
|---|---|---|---|
| 3,208,769 A | 9/1965 | Onori | |
| 4,205,453 A * | 6/1980 | Steele | B60D 1/38 280/477 |
| 6,467,713 B1 * | 10/2002 | Watanabe | A61H 1/0218 242/375.1 |
| 6,926,027 B1 * | 8/2005 | Sorensen | B65H 75/425 137/351 |
| 8,360,371 B2 * | 1/2013 | Getts | F16L 3/01 248/58 |
| 2013/0140407 A1 * | 6/2013 | Getts | F16L 3/12 248/58 |
| 2017/0259791 A1 * | 9/2017 | Kimener | B60S 9/16 |

* cited by examiner

*Primary Examiner* — Sang K Kim
(74) *Attorney, Agent, or Firm* — Vidas, Arrett & Steinkraus PA; Richard A. Arrett; Edwin E. Voigt, II

(57) ABSTRACT

The air hose retention device includes a first connector pivotally engaged to a top and an outer spool having a receiving area. A second side of a housing is rotatably engaged to a first side. A cable is wound on the outer spool. A spring is disposed in the receiving area. Pulling of the cable causes rotation of the second side in a first direction and the coiling of the spring. Movement of the cable towards the housing uncoils the spring winding the cable about the outer spool and rotating the second side in a second direction. The cable has a releasable connector which is engaged to a connector hose of a trailer. The air hose retention device may be easily disconnected from both a cab and a connector hose for storage or transportation in a cab of a truck during periods of nonuse.

12 Claims, 5 Drawing Sheets

AIR HOSE RETENTION SYSTEM

FIELD OF THE INVENTION

Generally the invention is directed to a retractable device which is releasably engaged to the rear of a cab of a tractor truck. The retractable device supports a desired number of connection hoses, including air brake hoses, between the tractor and the trailer of a tractor truck trailer vehicle.

BACKGROUND

In the past devices have been used to engage the hoses extending from the cab of a truck to the trailer. The known devices have been permanently mounted to the cab of the truck. The most common devices have used springs to elevate the hoses between the cab and the trailer. Technology improvements which have occurred to fittings and to air hoses extending between the truck tractor and trailer have reduced the utility and performance of the know devices.

In the past the known hose supports have failed to adequately protect the connection fittings and the integrity of the hoses against breakage or leakage occurring as a result of contact between, or entanglement with, the tractor bed or the fifth wheel coupling plate. In addition, the known hose supports have failed to adequately protect the connection fittings and the hoses from contact with grease or oil, and the associated degradation and wear resulting from prolonged contact with chemical or abrasive compositions.

In the past the known hose supports have also failed to adequately prevent entanglement and/or twisting between the hoses and the hose supports making separation and disconnection of previously attached hoses problematic, as well as frustrating.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entireties.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

GENERAL DESCRIPTION OF THE INVENTION

The air hose retention device supports tractor-trailer air brake connection hoses and connection fittings from breakage or leakage occurring as a result of contact with, or entanglement to, the fifth wheel coupling area or coupling platform of a tractor truck. The air hose retention device prevents the connection hoses from rubbing on the bed of the tractor reducing exposure to grease, oil, other chemicals or abrasives. Associated wear and deterioration of the air brake connection hoses and fittings are thereby minimized.

The air hose retention device is formed of a housing having a first connector proximate and pivotally engaged to the top of the housing. Within the interior of the housing is located an outer spool structure having an elongate cable. The outer spool structure is proximate to a circular structural receiving area which in turn is engaged to a recoil or other type of spring assembly. The recoil spring assembly continuously exerts a desired amount of tension on the elongate cable, while simultaneously permitting the free extension and retraction/winding of the elongate cable about the outer spool structure as a tractor truck turns or otherwise moves relative to a trailer. The recoil spring assembly, circular structural receiving area and elongate cable continually maintain the connection hoses in a desired elevated position relative to fifth wheel coupling area or coupling platform of the tractor truck during use.

In one embodiment, the exterior end of the elongate cable may be either releasably attached, or permanently affixed to a first releasable connector, which in one embodiment may be a carabiner. In turn, the first releasable connector may be releasably attached to a second connector which is integral to a block assembly. The block assembly includes a plurality of passages, each of which receives a connection hose such as an air hose, electric wires, cooling hose or hydraulic hose to name a few of the many examples of hoses extending between a tractor truck and a trailer.

Following use, the pivotal first connector may be quickly and easily separated from the rear of the tractor truck, and the first releasable connector may be quickly and easily separated from the block assembly, whereupon the air hose retention device may be placed into a cab for future use or may be attached to another tractor truck-trailer vehicle.

In one embodiment, the connection hoses or conduits do not become tangled or twisted when the tractor truck makes a turn or when the tractor truck is positioned at an angle relative to the trailer.

In one embodiment, the air hose retention device includes a housing having a top, a bottom, an interior, and a first connector pivotally engaged to the top, the housing further having a first structural side and a second structural side, the first structural side having a shaft and a spring retention tab adjacent to the shaft, the second structural side having an outer spool structure, the outer spool structure having a circular structural receiving area having a central collar, the central collar surrounding a portion of the shall, the circular structural receiving area having a slot, the outer spool structure further having a cable receiving connector, the second structural side being rotatably engaged to the shaft and to the first structural side; an elongate cable affixed to and wound about the outer spool structure, the elongate cable having an exterior end extending outside of the housing and an interior cable end affixed to the cable receiving connector within the housing; and a recoil spring having a first spring end and a second spring end, the second spring end having the shape of a hook, at least a portion of the hook being disposed between the shaft and the spring retention tab, the recoil spring being wound and disposed between the central collar and the circular structural receiving ea establishing an initial amount of force for an at rest cable retracted position, the first spring end being disposed in the slot; wherein, pulling force on the exterior end of the elongate cable causes rotation of the second structural side in a first outward direction relative to the first structural side and the coiling of the recoil spring into an extended cable position, and movement of the elongate cable towards the housing uncoils the recoil spring winding the elongate cable about the outer spool structure rotating the second structural side in a second retraction direction to an at rest cable retracted position.

In another embodiment, the second structural side has spool supports extending between the circular structural receiving area and the outer spool structure, and the slot traverses the circular structural receiving area.

In a further embodiment, the exterior end comprises a first releasable connector which is releasably engaged to a block assembly.

In an alternate embodiment, the first releasable connector is releasably engaged to a second connector of a block assembly, the block assembly having a plurality of passages.

In another alternative embodiment, at least one of the plurality of passages receives a connection hose of a trailer.

In another embodiment, a second releasable connector is engaged to at least one of the cab and the first connector or the second releasable connector is engaged to both the cab and the first connector.

In a further embodiment, the bottom of the housing has an orifice and the elongate cable passes through the orifice.

In another embodiment, the first outward direction of rotation is opposite to the second retraction direction of rotation.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

Figure 1:
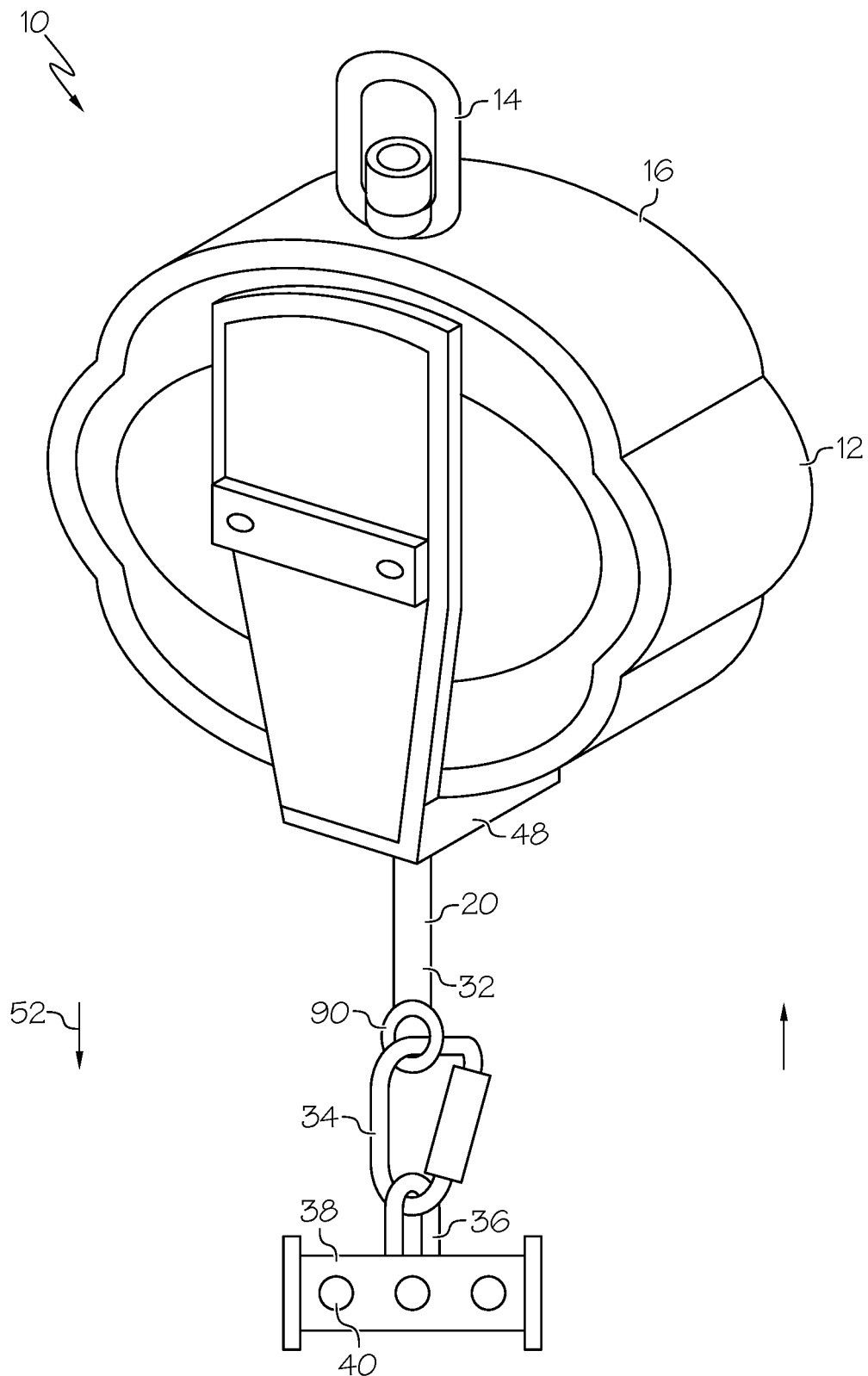
FIG. 1 is an isometric perspective front elevation view of the air hose retention device.

In general, the air hose retention device 10 is releasably engaged to the rear of a cab 84 of a tractor truck 24. The air hose retention device 10 may be attached to a block assembly 38 by a first releasable connector 34 which in one embodiment may be a carabiner. The first connector 14 of the air hose retention device 10 may also be releasably attached to a bar or bracket 88 which in turn may be securely installed to the rear surface of the cab 84 by a manufacture. In at least one embodiment the air hose retention device 10 will be formed of, or encased within, metal or plastic material, in order to protect the air hose retention device 10 from weather and other environmental conditions.

Referring to FIG. 1, in one embodiment a first connector 14 is rotatably connected to the top 16 of the housing 12. The first connector 14 may be releasably engaged to a bar or bracket 88 by a second releasable connector 50. The bottom 48 of the housing 12 includes an orifice 86 which permits the elongate cable 20 to extend from the interior 44 to the exterior of the housing 12.

In one embodiment the exterior end 32 of the elongate cable 20 includes a loop 90 for releasable engagement to a first releasable connector 34. In another embodiment the exterior end 32 may be permanently attached to the first releasable connector 34. As my be seen in FIG. 1 in one embodiment, the first releasable connector 34 is a carabiner. In other embodiments the first releasable connector 34 may be selected from any sturdy type or style of releasable mechanical fastener including hooks, clasps, springs or threads.

As may be seen in FIG. 1, in one embodiment, the first releasable connector 34 is engaged to a second connector 36 of a block assembly 38. In this embodiment the second connector 36 is integral to the block assembly 38. The block assembly 38 includes a plurality of passages 40 where each passages 40 may releasably or permanently receive a connection hose 42. Examples of connection hose 42 include, but are not necessarily limited to, hoses such as air hoses, electrical wires, pneumatic hoses and cooling hoses to name a few of the variety of connection hose 42 which may extend between a tractor truck 24 and a trailer 26. In at least one embodiment, the block assembly 38 is formed of two parts (not shown) which may uncoupled relative to each other to facilitate the engagement, disengagement and/or replacement of a connection hose 42 as used between a tractor truck 24 and trailer 26.

Figure 2:
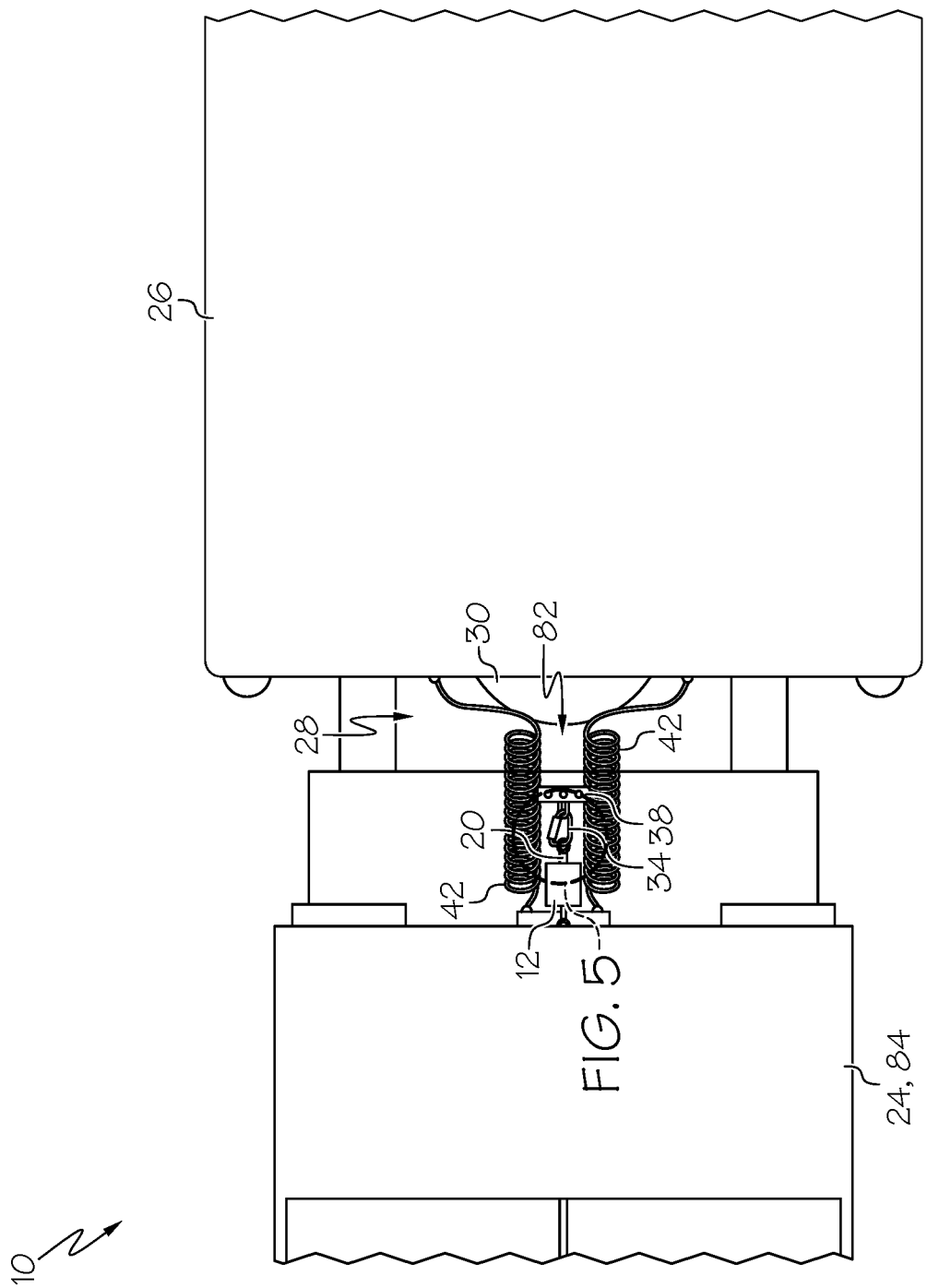
FIG. 2 is an environmental top plan view of the view of the air hose retention device engaged to a tractor truck.

As may be seen in FIG. 2, the cab 84 of the tractor truck 24 is aligned with the trailer 26. In this relative position the elongate cable 20 is in the at rest retracted position 82 where the recoil spring 22 has an initial spring tension drawing the elongate cable 20 inwardly for winding around outer spool structure 18. In the at rest retracted position 82 the elongate cable 20 as engaged to the block assembly 38 elevates the connection hose 42 above, and avoids contact between, the connection hose 42 and the fifth wheel coupling area 28 and coupling platform 30 of the tractor truck 24. The elevation of the connection hose 42 above the fifth wheel coupling area 28 and coupling platform 30 prevents twisting or dragging, and reduces wear, prolonging the useful life of the connection hose 42.

Figure 3:
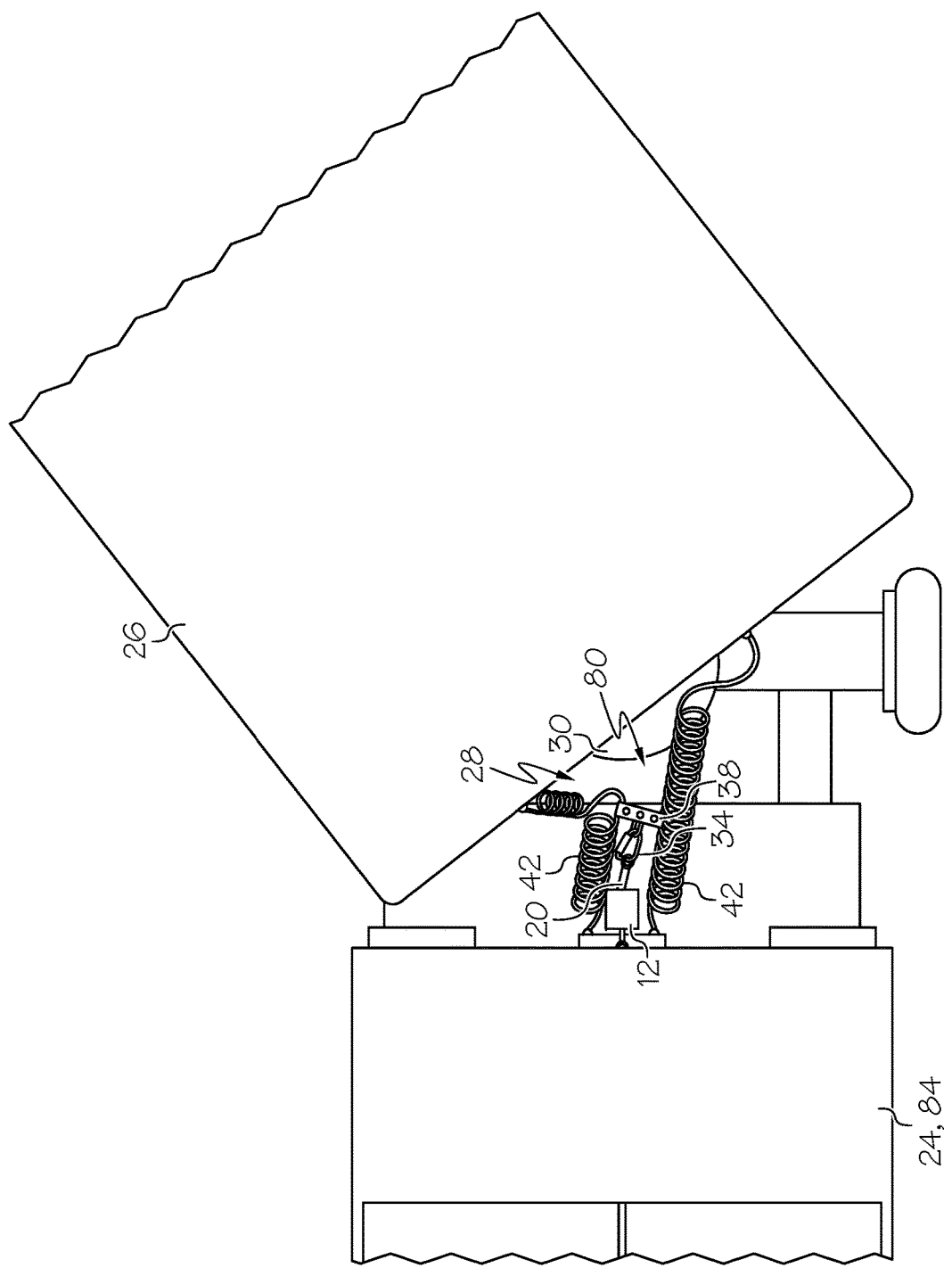
FIG. 3 is an alternative environmental top plan view of the view of the air hose retention device engaged to a tractor truck.

As may be seen in FIG. 3, the tractor truck 24 is at an angle relative to the trailer 26 which would occur during the manipulation of a turn, or the backing of the trailer 26 into a loading or unloading bay or dock. In FIG. 3 the movement of the trailer 26 away from the rear of the cab 84 exerts a drawing force pulling elongate cable 20 outwardly from the housing 12 in a first outward direction 52 to a extended cable position 80. The drawing of the exterior end 32 outwardly away from the housing 12 compresses the recoil spring 22, increasing tension on the elongate cable 20. The compression of the recoil spring 22 continues to elevate the block assembly 38 and connection hose 42 above the fifth wheel coupling area 28 and coupling platform 30 during manipulation of the turn, or the backing of the trailer 26. In addition, during the manipulation of a turn, or the backing of the trailer 26 the pivotal attachment of the first connector 14 to the bar or bracket 88 prevents the twisting or the entanglement of adjacent connection hoses 42 as engaged to the block assembly 38.

A return of alignment of the trailer 26 to the tractor truck 24 causes the recoil spring 22 to uncoil and to exert force to wind the elongate cable 20 in second retraction direction 54 about the outer spool structure 18 to the at rest retracted position 82. The winding of the elongate cable 20 on the outer spool structure 18 in turn maintains a desired amount of force upon the elongate cable 20, block assembly 38 and connection hose 42, elevating the connection hoses 42 above the fifth wheel coupling area 28 and coupling platform 30. Simultaneously with the drawing of the elongate cable 20 in second retraction direction 54, the first connector 14 may pivot relative to the cab 84 and bar or bracket 88 to prevent twisting or entanglement of adjacent connection hoses 42 as engaged to the block assembly 38.

Figure 4:
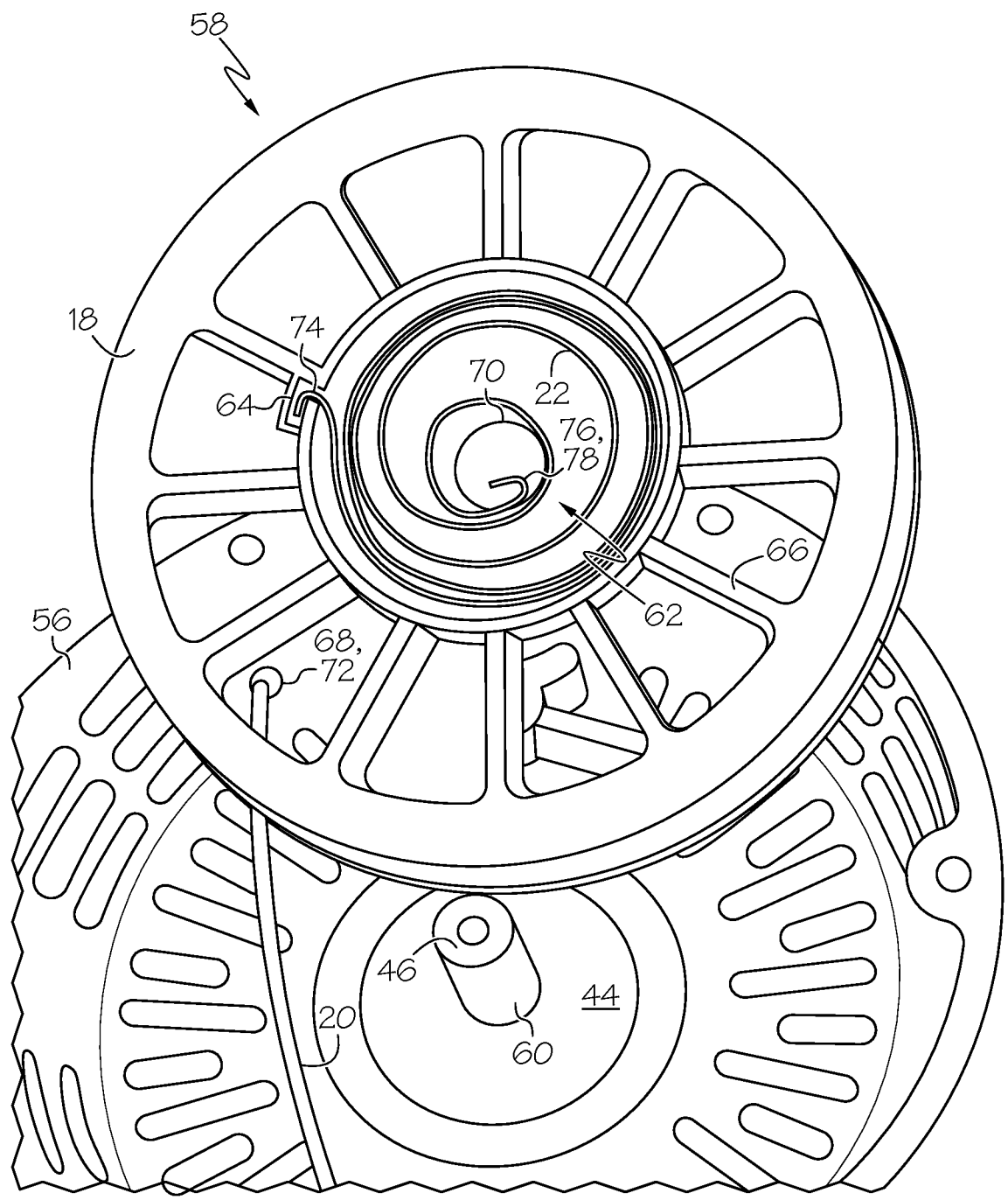
FIG. 4 is a detail top plan view of one embodiment of the recoil spring, the interior of the first structural side of the housing, and the interior of the second structural side of the housing for one alternative embodiment of the air hose retention device.
Figure 5:
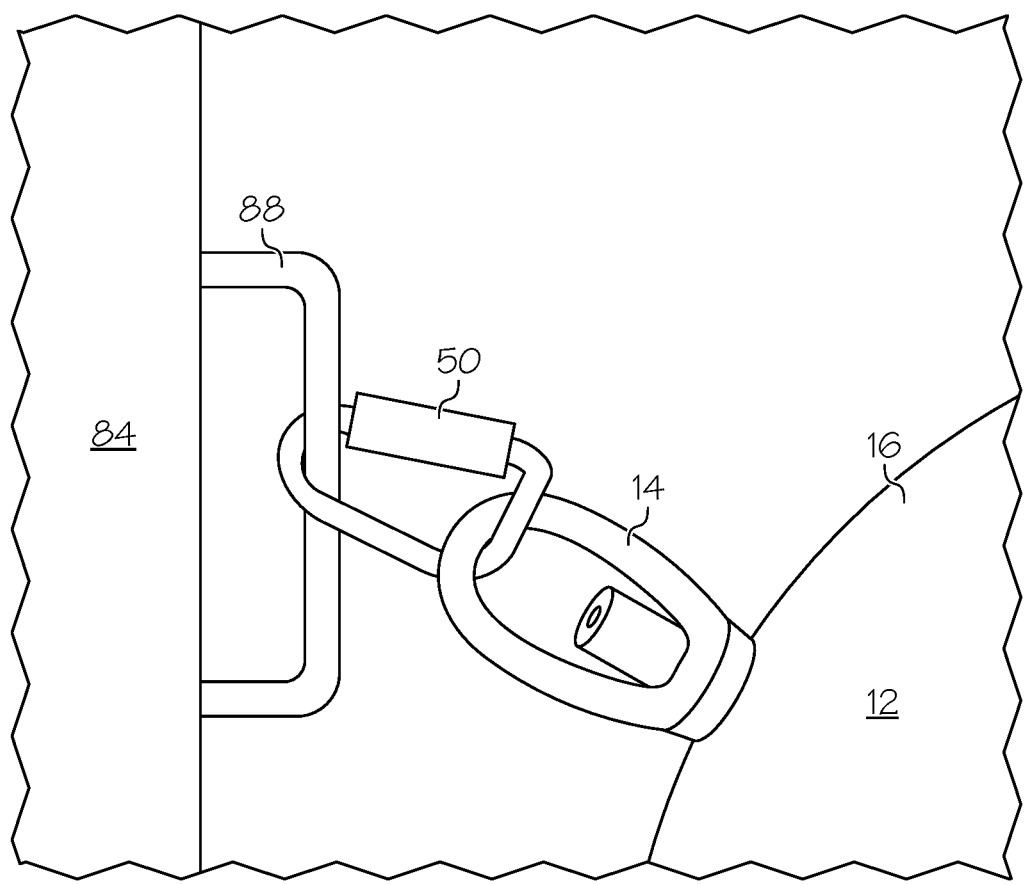
FIG. 5 is a detail isometric perspective front elevation view of a bar engaged to the rear of a cab of a tractor truck and second releasable connector of the air hose retention device.

As may be seen in FIG. 4, a first structural side 56 of the housing 12 includes a shaft 46 and a spring retention tab 60. A second structural side 58 of housing 12 includes a central collar 70, a circular structural receiving area 62, a plurality of spool supports 66 and the outer spool structure 18. A recoil spring 22 having an initial coiled level of tension is disposed between the shaft 46 and the circular structural receiving area 62. The recoil spring 22 includes a first spring end 74 and a second spring end 76. The first spring end 74 is preferably positioned in a slot 64 which traverses the circular structural receiving area 62. The second spring end 76 preferably includes a hook shape and following assembly is positioned so that the hook of the second spring end 76 is between and engaged to both of the shaft 46 and the spring retention tab 60. In at least one embodiment a fastener may be used the secure the first structural side 56 to the second structural side 58 to form the housing 12.

In FIG. 4, the second structural side 58 is required to be flipped 180 degrees so that the recoil spring 22 is proximate to the shaft 46 and spring retention tab 60 prior to the connection of the second structural side 58 to the first structural side 56.

In one embodiment, the interior cable end 68 is secured to a cable receiving connector 72 which is proximate to outer spool structure 18. The exterior end 32 extends through the orifice 86 to the exterior of the assembled housing 12.

In at least one embodiment as shown in FIG. 4, the recoil spring 22 is a length of narrow and thin metal that is coiled tightly and then inserted into the second structural side 58 with the notched first spring end 74 inserted into a slot 64 in the circular structural receiving area 62. Following assembly of the second structural side 58 to first structural side 56 the second spring end 76 is engaged to the shaft 46 and spring retention tab 60. As force is exerted on the elongate cable 20 and exterior end 32 in the first outward direction 52 the second structural side 58 is rotated winding the recoil spring 22 tighter and tighter, providing the recoil necessary to maintain the block assembly 38 and connection hoses 42 elevated above the fifth wheel coupling area 28 and the coupling platform 30.

Pulling force on the elongate cable 20 in the first outward direction 52 causes the rotation of the second structural side 58 relative to the first structural side 56. The first structural side 56 does not rotate during the coiling of the recoil spring 22. The return of the exterior end 32 of the elongate cable 20 towards the housing 12 enables the recoil spring 22 to uncoil and the second structural side 58 to rotate in the opposite second retraction direction 54, winding the elongate cable 20 around the outer spool structure 18.

In one embodiment, the tractor truck 24 and trailer 26 are pivotally connected to the fifth wheel coupling area 28 of the tractor 24 by a coupling platform 30. The trailer 26 is provided with air brakes operated from the tractor truck 24, the tractor truck 24 being provided with compressed air communicated to the trailer 26 through connection hoses 42. The trailer 26 may be provided with air brake hoses 42 connected to an air break mechanism. In some embodiments the connection hoses 42 are detachably connected through the use of releasable quick connectors.

In a preferred embodiment, the air hose retention device 10 replaces the known springs and/or bungie cords which have been previously used to attempt to elevate connection hoses 42 above the fifth wheel coupling area 28 and the coupling platform 30.

In at least one embodiment the outer spool structure 18 is formed of a pair of circumferentially parallel walls defining an interior groove. The elongate cable 20 is preferably wound around the outer spool structure 18 and is positioned in the groove between the pair of circumferentially parallel walls.

In at least one embodiment when the connection hoses 42 are extended during the sharp angular positioning of the tractor truck 24 relative to the trailer 26, the elongate cable 20 is drawn from at rest retracted position 82 from the housing 12 and is unwound from outer spool structure 18 causing an increase in tension on recoil spring 22. The elongate cable 20 may have a significant length, which may translate an increasing amount of tension onto recoil spring 22.

In one embodiment upon the realignment of the trailer 26 relative to the tractor truck 24 the recoil spring 22 uncoils and rewinds the elongate cable 20 on the outer spool structure 18 to the at rest retracted position 82. During the movement of the elongate cable 20 in the first outward direction 52, and the movement of the elongate cable 20 in the second retraction direction 54, the connection hoses 42 are maintained at a desired elevation above the fifth wheel coupling area 28 and the coupling platform 30. It should be noted that the coiling and uncoiling forces of the recoil spring 22 which occur as a result of the movement of the elongate cable 20 in the first outward direction 52 or the second retraction direction 54 are not transferred or translated onto the connection hose 42's.

In a first alternative embodiment an air hose retention device includes a housing 12 having a top 16, a bottom 48, an interior 44, and a first connector 14 pivotally engaged to the top 16, the housing 12 further having a first structural side 56 and a second structural side second structural side 58, the first structural side 56 having a shaft 46 and a spring retention tab 60 adjacent to the shaft 46, the second structural side 58 having an outer spool structure 18, the outer spool structure 18 having a circular structural receiving area 62 having a central collar 70, the central collar 70 surrounding a portion of the shaft 46, the circular structural receiving area 62 having a slot 64, the outer pool structure 18 having a cable receiving connector 72, the second structural side 58 being rotatably engaged to the shaft 46 and to the first structural side 56; an elongate cable 20 affixed to and wound about the outer spool structure 18, the elongate cable 20 having an exterior end exterior end 32 extending outside of the housing 12 and an interior cable end 68 affixed to the cable receiving connector 72 within said housing 12; and a recoil spring 22 having a first spring end 74 and a second spring end 76, the second spring end 76 having the shape of a hook 78, at least a portion of the hook 78 being disposed between the shaft 46 and the spring retention tab 60, the recoil spring 22 being wound and disposed between the central collar 70 and the circular structural receiving area 62 establishing an initial amount of force for an at rest cable retracted position 82, the first spring end 74 being disposed in said slot 64; wherein, pulling force on the exterior end 32 of elongate cable 20 causes rotation of the second structural side 58 in a first outward direction 52 relative to the first structural side 56 and the coiling of the recoil spring 22 into an extended cable position 80, and movement of the elongate cable 20 towards the housing 12 uncoils the recoil spring 22 winding the elongate cable 20 about the outer spool structure 18 rotating the second structural side 58 in a second retraction direction 54 to an at rest cable retracted position 82.

In a second alternative embodiment according to the first embodiment, the second structural side 58 has spool supports 66 extending between the circular structural receiving area 62 and the outer spool structure 18.

In a third alternative embodiment according to the second embodiment, the slot 64 traverses the circular structural receiving area 62.

In a fourth alternative embodiment according to the third embodiment, the exterior end exterior end 32 comprises a first releasable connector 34.

In a fifth alternative embodiment according to the fourth embodiment, the first releasable connector 34 is releasably engaged to a cab 84 of a tractor truck 24.

In a sixth alternative embodiment according to the fifth embodiment, the first releasable connector 34 is releasably engaged to a second connector 36 of a block assembly block assembly 38.

In a seventh alternative embodiment according to the sixth embodiment, the block assembly 38 has a plurality of passages 40.

In an eighth alternative embodiment according to the seventh embodiment, at least one of the plurality of passages 40 receives a connection hose 42 of a trailer 26.

In a ninth alternative embodiment according to the eighth embodiment, a second releasable connector 50 is engaged to at least one of the cab 84 and the first connector 14.

In a tenth alternative embodiment according to the ninth embodiment, the second releasable connector 50 is engaged to both of the cab 84 and the first connector 14.

In an eleventh alternative embodiment according to the tenth embodiment, the bottom 48 has an orifice 86, the elongate cable 20 passing through the orifice 86.

In a twelfth alternative embodiment according to the eleventh embodiment, the first outward direction is opposite to said second retraction direction.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

I claim:

1. An air hose retention device comprising:
a housing having a top, a bottom, an interior, and a first connector pivotally engaged to said top, said housing further having a first structural side and a second structural side, said first structural side having a shaft and a spring retention tab adjacent to said shaft, said second structural side having an outer spool structure, said outer spool structure having a circular structural receiving area having a central collar, said central collar surrounding a portion of said shaft, said circular structural receiving area having a slot, said outer spool structure further having a cable receiving connector, said second structural side being rotatably engaged to said shaft and to said first structural side;
an elongate cable affixed to and wound about said outer spool structure, said elongate cable having an exterior end extending outside of said housing and an interior cable end affixed to said cable receiving connector within said housing; and
a recoil spring having a first spring end and a second spring end, said second spring end having the shape of a hook, at least a portion of said hook being disposed between said shaft and said spring retention tab, said recoil spring being wound and disposed between said central collar and said circular structural receiving area establishing an initial amount of force for an at rest cable retracted position, said first spring end being disposed in said slot;
wherein, pulling force on said exterior end of elongate cable causes rotation of the second structural side in a first outward direction relative to the first structural side and the coiling of said recoil spring into an extended cable position, and movement of said elongate cable towards said housing uncoils said recoil spring winding said elongate cable about said outer spool structure rotating said second structural side in a second retraction direction to an at rest cable retracted position.

2. The air hose retention device according to claim 1, said second structural side having spool supports extending between said circular structural receiving area and said outer spool structure.

3. The air hose retention device according to claim 2, said slot traversing said circular structural receiving area.

4. The air hose retention device according to claim 3, said exterior end comprising a first releasable connector.

5. The air hose retention device according to claim 4, said first releasable connector is releasably engaged to a cab of a tractor truck.

6. The air hose retention device according to claim 5, wherein said first releasable connector is releasably engaged to a second connector of a block assembly.

7. The air hose retention device according to claim 6, said block assembly having a plurality of passages.

8. The air hose retention device according to claim 7, wherein at least one of said plurality of passages receives a connection hose of a trailer.

9. The air hose retention device according to claim 8, wherein a second releasable connector is engaged to at least one of said cab and said first connector.

10. The air hose retention device according to claim 9, wherein said second releasable connector is engaged to both of said cab and said first connector.

11. The air hose retention device according to claim 10, said bottom having an orifice, said elongate cable passing through said orifice.

12. The air hose retention device according to claim 11, wherein said first outward direction is opposite to said second retraction direction.

* * * * *